US012793245B2

(12) United States Patent
Zhu et al.

(10) Patent No.: US 12,793,245 B2
(45) Date of Patent: Nov. 10, 2026

(54) SPARSE DEPTH IMAGING WITH INTERPOLATED DEPTH VALUES

(71) Applicant: Microsoft Technology Licensing, LLC, Redmond, WA (US)

(72) Inventors: Ling Zhu, Palo Alto, CA (US); John Peter Godbaz, Sunnyvale, CA (US); Vishali Mogallapu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 18/905,039

(22) Filed: Oct. 2, 2024

(65) Prior Publication Data

US 2026/0094288 A1 Apr. 2, 2026

(51) Int. Cl.

| | |
|---|---|
| ***G06T 7/521*** | (2017.01) |
| ***G01B 11/22*** | (2006.01) |
| ***G01S 7/481*** | (2006.01) |
| ***G01S 17/89*** | (2020.01) |
| ***G06T 3/04*** | (2024.01) |

(52) U.S. Cl.

CPC .............. *G06T 7/521* (2017.01); *G01B 11/22* (2013.01); *G01S 7/4814* (2013.01); *G01S 7/4816* (2013.01); *G01S 17/89* (2013.01); *G06T 3/04* (2024.01); *G06T 2207/10028* (2013.01); *G06T 2207/10048* (2013.01)

(58) Field of Classification Search

None

See application file for complete search history.

(56) References Cited

U.S. PATENT DOCUMENTS

2016/0004920 A1* 1/2016 Armstrong-Crews ........................ G01B 11/2513 348/46
2019/0310376 A1* 10/2019 Geuens .................... G01S 17/18
2020/0104567 A1* 4/2020 Tajbakhsh ............ G06V 40/165
2020/0404243 A1* 12/2020 Saphier .................. A61C 9/006

FOREIGN PATENT DOCUMENTS

WO WO-2025090075 A1 * 5/2025 ........... G06F 1/1686

* cited by examiner

*Primary Examiner* — Bernard Krasnic
(74) *Attorney, Agent, or Firm* — Alleman Hall LLP

(57) ABSTRACT

A method for operating a sparse depth imaging system is presented. The method comprises receiving a depth map of an environment. The depth map comprises a plurality of pixels having locations in an optical sensor coordinate system. A pattern of illuminator dots in an optical source coordinate system is received. Each illuminator dot has a fixed location in a defined plane in the optical source coordinate system. The depth map is projected into a 3D point cloud in the optical sensor coordinate system. Each point in the 3D point cloud is assigned a 2D location in the defined plane. A depth value for each illuminator dot is interpolated based on transformed depth of points in the 3D point cloud. Each illuminator dot is assigned a 3D location in the optical sensor coordinate system. A depth for each illuminator dot is output in the optical sensor coordinate system.

18 Claims, 7 Drawing Sheets

SPARSE DEPTH IMAGING WITH INTERPOLATED DEPTH VALUES

BACKGROUND

Depth-imaging systems are becoming more commonly used in a variety of consumer electronic devices. For example, some smartphones include integrated, front-facing depth-imaging systems. Further, some laptops and other personal computers include integrated, user-facing depth-imaging systems. Video game systems may include peripheral depth-imaging systems for gesture recognition. Virtual and augmented reality headsets include integrated, world-facing depth-imaging system for machine vision and may further include user-facing depth-imaging systems. In any of such systems, the reliability of gesture recognition, face recognition, and other input modalities depends upon the fidelity of the underlying depth imaging.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one example, a method for operating a sparse depth imaging system is presented. The method comprises receiving a depth map of an environment. The depth map comprises a plurality of pixels having locations in an optical sensor coordinate system. A pattern of illuminator dots in an optical source coordinate system is received. Each illuminator dot has a fixed location in a defined plane in the illuminator coordinate system. The depth map is projected into a 3D point cloud in the optical sensor coordinate system. Each point in the 3D point cloud is assigned a 2D location in the defined plane. A depth value for each illuminator dot is interpolated based on transformed depth of points in the 3D point cloud. Each illuminator dot is assigned a 3D location in the optical sensor coordinate system. A depth for each illuminator dot is output in the optical sensor coordinate system.

DETAILED DESCRIPTION

Many different types of depth imaging system technology exist. As one example, indirect time-of-flight (iTOF) uses a phase shift in amplitude modulated light that is projected into the environment and received at the camera to determine distances for each pixel. iTOF sparse depth imaging, which uses a sparse pattern of dots projected by an illuminator, allows for increased performance under high ambient or outdoor light, for darker colored objects, etc. However iTOF sparse depth presents challenges in performing illumination dot localization and depth calculations for illumination dots, because the illumination dot locations in the optical sensor coordinates are unknown in depth images due to a lateral offset between the optical source and optical sensor on the depth imaging device.

Figure 1:
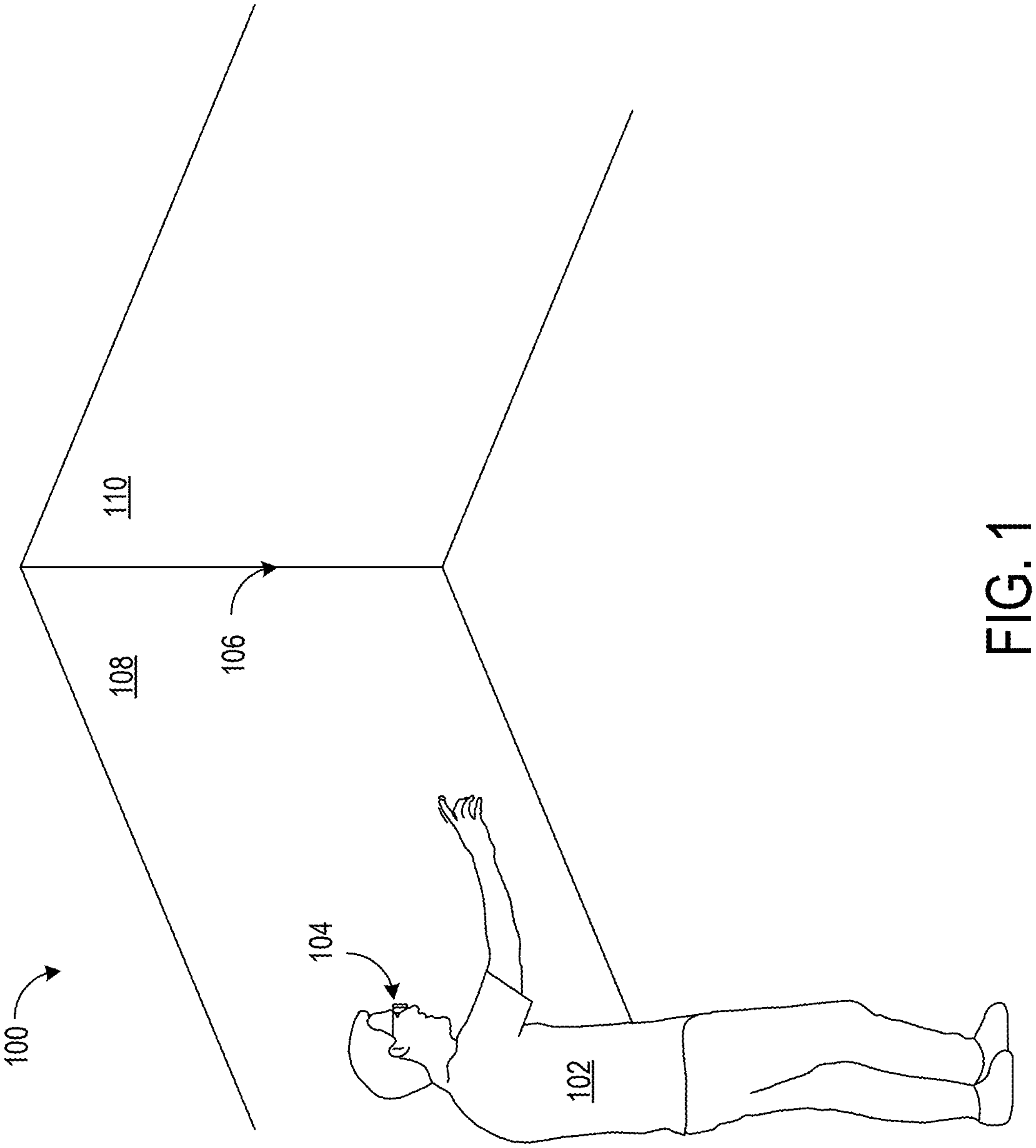
FIG. 1 shows an example environment for operating a depth imaging system.

FIG. 1 shows an example environment 100 for operating a depth camera. In this example, user 102 is operating a head-mounted device (HMD) 104 comprising a depth camera. Multipath effects are generated when multiple illumination paths are reflected to a pixel. Multipath effect can make it difficult to determine a true distance-to-object. This is particularly noticeable in locations such as room corner 106. While wall 108 and wall 110 may provide reliable distance-to-object measurements, high levels of illumination in room corner 106 results in multiple light bounces off of wall 108 and wall 110. The end result is that room corner 106 can appear curved in the resulting depth image.

As mentioned above, iToF cameras utilize a detected phase shift in received light to determine a depth at a pixel. Multiple different illumination frequences can be used to increase an unambiguous depth sensing range (due to the phase of received light wrapping every 2π radians for each illumination frequency). In sparse iToF depth imaging, a fixed dot pattern is used to sparsely illuminate the environment, thus concentrating the illumination into small sub regions of the image, and effectively increasing optical power. Sparse iToF depth imaging solves multipath issues caused by multiple diffuse reflections within a scene by reducing the number of reflections and increasing the signal-to-noise (SNR) relative to the multipath interference. Reflections are generally diffuse at low spatial frequencies. The light of each structured dot is concentrated, so the ratio of true signal to multipath reflections is high. Sparse depth also enables hybrid depth imaging, where triangulation among the sparse-projection features provides an independent depth value suitable to assist phase unwrapping (e.g., disambiguating wrapped phase data using multiple images acquired using different illumination frequencies) or other aspects of iToF imaging.

The raw depth image in iTOF depth imaging comprises a depth value at each pixel for an optical sensor. The pixel locations corresponding to illumination dots have a higher signal to noise (S/N) ratio, and thus the depth error is very low in the illumination dot locations. Conversely, the values for pixels located between the illumination dots have high S/N ratio because the received light signal is generally low. In constructing the refined depth image, the depth values for the bright illumination dots are thus the desired values. However, the locations of the illumination dots in the optical sensor coordinate system are unknown due to the lateral offset between the optical source and the optical sensor. The dot location in the optical sensor coordinate system varies depending on object locations and distances (e.g., environmental depth). Calibration images (e.g., flat walls) do not experience this issue.

Traditionally, the intensity of the pixels of the received depth image are used to find the most intense pixels, and thus to find the locations of the illumination dots and the most accurate depth values. As an example, a 3×3 kernel may be seeded, converted to log scale, and illumination peaks discerned in the log scale. However, locating illumination dots in an image using this method can require significant image processing and associated higher power consumption. Locating illuminator dots requires a high S/N ratio, and hence is less resilient to the noise.

However, since the illumination dot pattern is known in the optical source coordinate system, the corresponding illumination dots can be found in the optical sensor coordinate system more efficiently. Herein, systems and methods are presented for efficient dot localization in received depth maps. Initially, the depth values from the optical sensor coordinate system are assigned locations into the optical source coordinate system, based on the calibrated distance between the optical source and the optical sensor. In the optical source coordinate system, the 3D points of the depth map can be projected in the normal plane to the illumination direction. In the normal plane to the illumination direction, the illumination dots are assigned depth values based on the depths of nearby pixels within the optical sensor coordinate system. The illumination dots can then be projected into 3D in the optical sensor coordinate system, thus generating an accurate sparse depth image, which consists of a depth value for the center of each dot. The technical effect of implementing such a method is a reduction in computational power needed to detect the illumination dot locations in a sensed depth image. This allows for better run-time efficiency in operating the depth imaging system.

Figure 2:
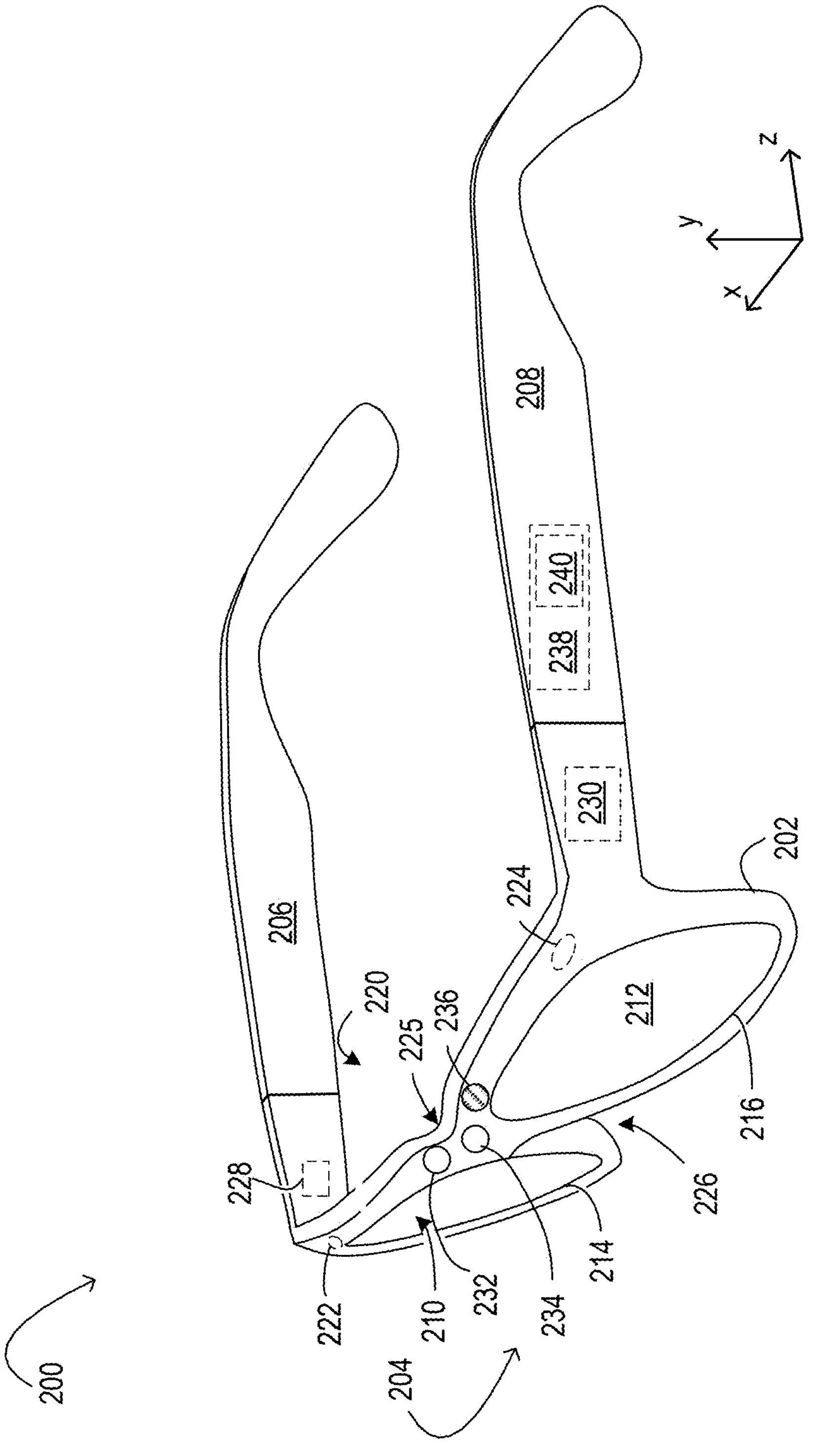
FIG. 2 shows one example of a head-mounted display device including a depth imaging system.

FIG. 2 shows one example of an HMD 200. The HMD 200 includes a frame 202, a display system 204, and temple pieces 206 and 208. Display system 204 includes a first display 210 and a second display 212 supported by frame 202. Each of first display 210 and second display 212 include optical components configured to deliver a projected image to a respective eye of a user. HMD 200 may be an example of HMD device 104 shown in FIG. 1.

Display system 204 includes a first display module 214 for generating and displaying a first image via first display 210, and a second display module 216 for generating and displaying a second image via the second display 212, where the first image and the second image combine to form a stereo image. In other examples, a single display module generates and displays first images and second images via first display 210 and second display 212, respectively. Each display module may comprise any suitable display technology, such as a scanned beam projector, a microLED (light emitting diode) panel, a microOLED (organic light emitting diode) panel, or an LCoS (liquid crystal on silicon) panel, as examples. Further, various optics, such as waveguides, one or more lenses, prisms, and/or other optical elements may be used to deliver displayed images to a user's eyes.

HMD 200 further includes an eye-tracking system 220, comprising at least a first eye-tracking camera 222 and a second eye-tracking camera 224. Data from the eye-tracking system 220 may be used to detect user inputs and to help render displayed images in various examples. Eye-tracking system 220 may further include a light source 225. Light emitted by light source 225 may reflect off of a user's eye and be detected by first eye-tracking camera 222 and a second eye-tracking camera 224. In some examples, the light source and the camera of the eye-tracking system are both located on frame 202 HMD 200.

The position of the user's eye(s) may be determined by eye-tracking system 220 and/or gesture recognition machine 228. For example, eye-tracking system 220 may receive image data from first eye-tracking camera 222 and second eye-tracking camera 224, and may evaluate that data using one or more neural networks or other machine-learning devices.

HMD 200 further includes an on-board computing system in the form of a controller 230 configured to render the computerized display imagery via first display module 214 and second display module 216. Controller 230 is configured to send appropriate control signals to first display module 214 to form a right-eye image of a stereoscopic pair of images. Likewise, controller 230 is configured to send appropriate control signals to second display module 216 to form a left-eye image of the stereoscopic pair of images. Controller 230 may include a logic subsystem and a storage subsystem, as discussed in more detail below with respect to FIG. 6. Operation of HMD 200 additionally or alternatively may be controlled by one or more remote computing device(s) (e.g., in communication with HMD 200 via a local area network and/or wide area network).

HMD 200 may further include various other components, for example an outward facing two-dimensional image camera 232 (e.g., a visible light camera and/or infrared camera), an outward facing depth imaging device 234, and an outward facing depth illuminating device 236. Outward facing depth imaging device 234 and outward facing depth illumination device 236 can be offset in the X and/or Y dimensions at a baseline distance. In a headset/glasses form-factor a 10-30 mm baseline can be used in some examples. While smaller baselines below 10 mm are possible, the advantages of this approach can be enhanced with larger baselines, as this increases the disparity for a given Z. For specialized long-range sensors, baselines such as 100 mm can be used in some examples but are more likely to be challenging in a headset/glasses form-factor.

HMD 200 may further include a sensor suite 238. Sensor suite 238 may include one or more inertial measurement units (IMUs) 240, which may include one or more accelerometers, gyroscopes, and/or magnetometers. IMUs 240 may be configured to generate positional information for HMD 200 that allows for determining a 6-degree-of-freedom (6DOF) position of the device in an environment. HMD 200 may further include various components that are not shown, including but not limited to speakers, microphones, temperature sensors, touch sensors, biometric sensors, other image sensors, energy-storage components (e.g., battery), a communication facility, a global positioning system (GPS) receiver, etc.

The HMD 200 is one example of a device that employs a depth camera that can be calibrated according to the calibration method of the present disclosure. In other examples, a depth camera may be integrated into other types of devices. The calibration method of the present disclosure is broadly applicable to any suitable depth camera that is configured to emit modulated structured light in a pattern, such as an iToF sparse depth camera.

Figure 3:
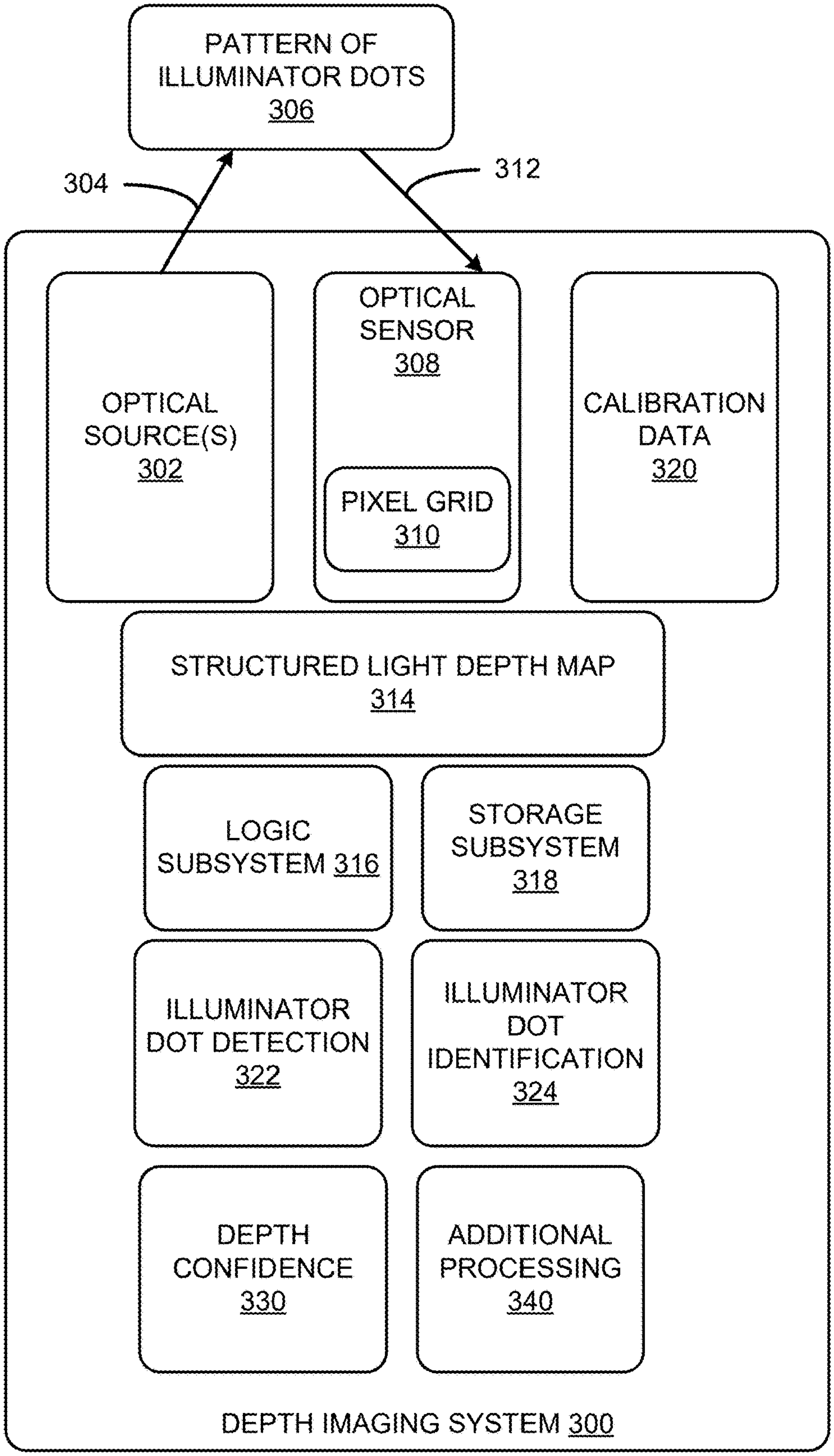
FIG. 3 schematically shows an example depth imaging system.

FIG. 3 schematically shows a block diagram of an example depth imaging system 300. For example, the depth imaging system 300 may be representative of the outward facing depth imaging device 234 and the outward facing depth illuminating device 236 of the HMD 200 shown in FIG. 2.

Depth camera 300 includes one or more optical source(s) 302. For example, optical source(s) 302 are configured to output modulated structured light 304 comprising a pattern of illuminator dots 306. More particularly, the modulated light is given a structural arrangement of units that can be organized in a repeating pattern, such as in a grid, or randomized pattern. Herein, the unit is described as a dot, but other shapes may be used. The optical source(s) 302 may thus project a structured light image onto a scene or environment where the projected light is also amplitude modulated. In such an example, the source of modulated light may be an incoherent light source, which emits transmitted light that is modulated with a signal at a modulation frequency. In an example, the amplitude of light from the device may be modulated such that the amount of illumination changes periodically. In a phase modulation system, the light emitter can output amplitude modulated light at multiple modulation frequencies. Further, the optical source(s) 302 may be selected so that the wavelength or wavelengths of the emitted light include the most appropriate wavelength(s) for a particular application and/or the characteristics of the environment being imaged.

In some examples, the depth camera 300 can have a single light source and single imaging system. However, in other examples, optical source(s) 302 include separate ToF light source and a separate structured light source. In such examples, the ToF light source emits amplitude modulated light suitable for ToF depth calculations. The structured light source emits structured light that is not modulated. Outward facing depth illuminating device 236 may be an example of optical source(s) 302.

In some implementations, the optical source(s) 302 are configured to output modulated structured infrared (IR) or near-infrared (NIR) light comprising the pattern of illuminator dots 306. Such IR or NIR light is not visible to the human eye and allows for operation that is not perceived by a user of the depth camera, and thus does not disturb the experience of the user with a visible structured light pattern.

The depth camera 300 includes an optical sensor 308 that comprises a 2D pixel grid 310. Optical sensor 308 can be used to capture illumination 312 reflected from the environment. The illumination 312 includes the structured light forming the pattern of illuminator dots 306. Optical sensor 304 can thus be used to capture a projected structured light image. The captured structured light image can then be processed by one or more components of FIG. 3 in order to generate a structured light depth map 314 based at least on the illumination 312 including the pattern of illuminator dots 306 reflected from the environment. The structured light depth map 314 comprises a plurality of depth values corresponding to the pixels of the 2D pixel grid 310 of the optical sensor 308.

The depth camera 300 comprises a logic subsystem 316 and a storage subsystem 318 that holds instructions executable by the logic subsystem 316 to perform computing operations that facilitate operation of the depth camera 300. The components shown in FIG. 3 can be implemented, for example, using a processing unit with associated memory that executes computer-executable instructions. More generally, the components shown in FIG. 3 can be implemented using any suitable combination of hardware, firmware, and/or software. Example computing devices are described herein and with regard to FIG. 7.

Optical source(s) 302 and optical sensor 308 may be offset at some distance (e.g., laterally). The spatial relationship between optical source(s) 302 and optical sensor 308 may be included in calibration data 320. In order to detect dots where they cannot be derived directly from the image, a calibration of some sort can be used to provide prior information of where the dots might be. A calibration phase may occur where the depth imaging system is aimed at a flat target, and images taken in depth and active brightness at one or more different distances. This may allow for tracking dots over those different differences, allowing for a model of dot positions to be derived. Calibration data may further be acquired for different temperatures, object reflections, lens distortion, different levels of ambient light, etc. In one example, the observed locations of the dots in the pattern of illuminator dots 306 are defined in terms of illumination coordinates that describe pixel positions in a normalized coordinate system corresponding to the 2D pixel grid 310 of the optical sensor 308 (e.g., (x, y) representing the horizontal position and the vertical position within this normalized space).

Figure 4:
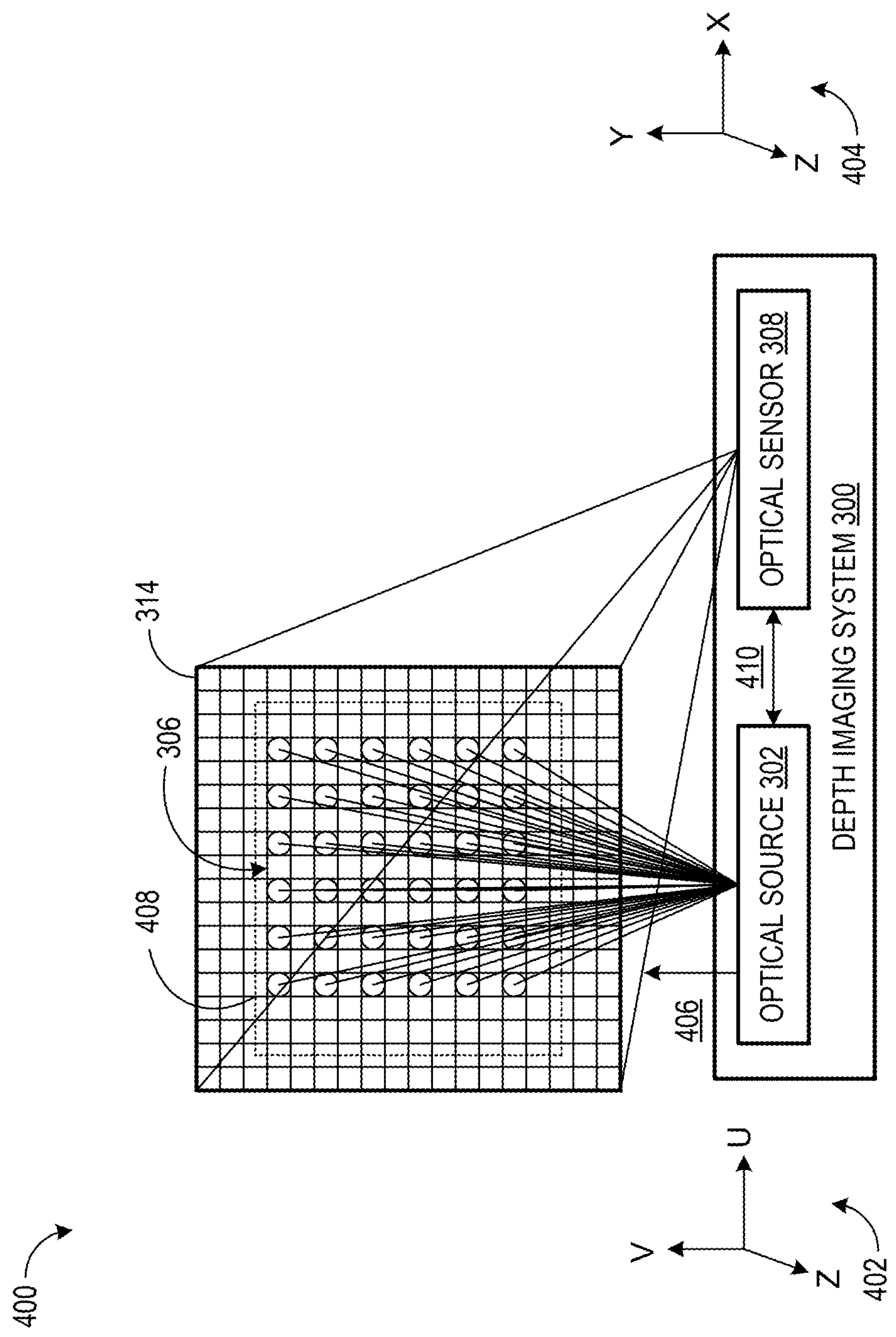
FIG. 4 depicts illumination dots projected in an optical source coordinate system and reflected in an optical sensor coordinate system.

FIG. 4 shows an example scenario 400 depicting optical source 302 projecting a pattern of illumination dots 306 in an optical source coordinate system 402 (e.g., U, V) which are then reflected from the environment to optical sensor 308 to generate structured light depth image 314 in an optical sensor coordinate system 404 (e.g., X, Y). In particular, optical source 302 illuminates the environment with modulated structured light comprising the pattern of illumination dots 306. In the illustrated example, the pattern of illumination dots 306 is a grid of dots arranged in evenly spaced rows and columns. Optical source 302 projects the pattern of illumination dots 306 in a projection direction 406. Each illumination dot may be assigned a position in an illuminator normal plane 408 (e.g., normal to projection direction 406) (dashed lines) Illuminator normal plane 408 corresponds to the center of each projection ray (e.g., the center of each illuminator dot). In other examples, a defined plane other than the illuminator normal plane can be used.

The optical sensor of the depth camera acquires the structured light depth image 314 of illumination reflected from the environment. The structured light depth image 314 includes the pattern of illumination dots 306, but the offset 410 between optical source 302 and optical sensor 308 means that the location of each illumination dot in optical sensor coordinate system 404 is unknown. These locations must be discerned prior to the structured light depth image 314 being refined. Further, one illumination dot in optical source coordinate system 402 may overlap with two or more pixels in optical sensor coordinate system 404.

Figure 5:
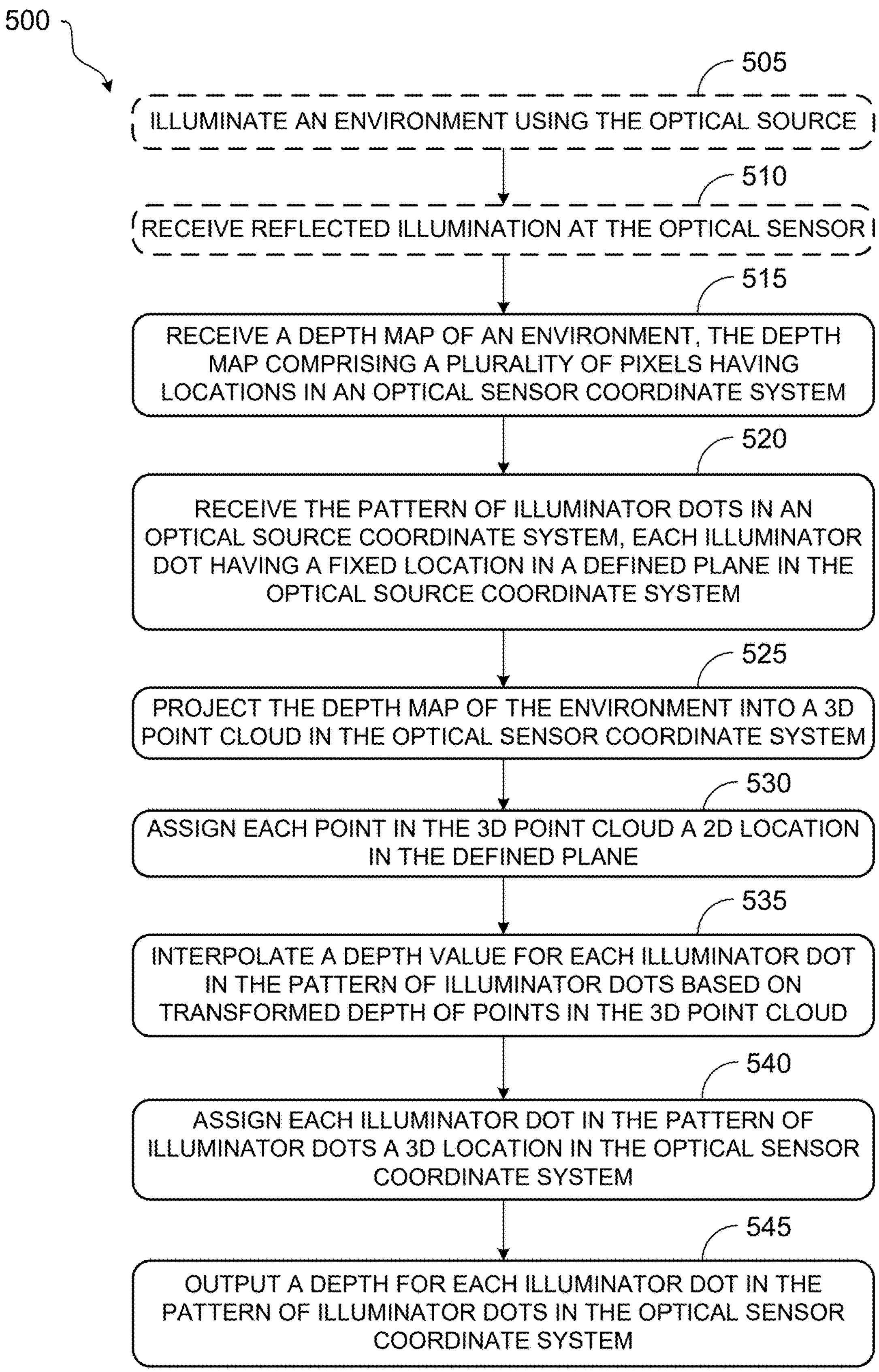
FIG. 5 shows a flow diagram for an example method for operating a sparse depth imaging system.

FIG. 5 shows a flow diagram for an example method 500 for locating illumination dots in a frame of depth image data for a depth imaging system. Example depth imaging systems that can perform method 500 include outward facing depth imaging device 234 and outward facing depth illuminating device 236, and/or depth imaging system 300 comprising optical source 302 and optical sensor 308. Optionally, at 505, method 500 comprises illuminating an environment using the optical source, such as shown in FIG. 4. Optionally, at 510, method 500 comprises receiving reflected illumination at the optical sensor, such as shown in FIG. 4. For example, method 500 may be performed locally bv an HMD that illuminates its environment and receives the reflected illumination. In other examples, a device remote to the depth imaging device may perform the following steps on data collected by the depth imaging device.

Figure 6A:
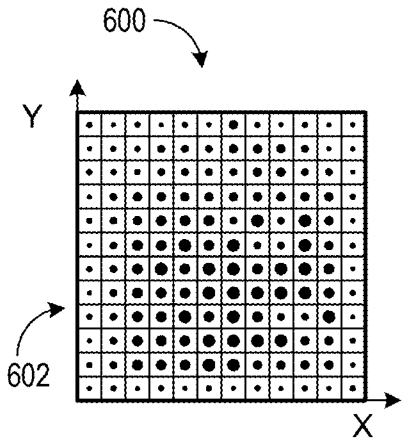
FIG. 6A shows an example depth map comprising a plurality of pixels having locations in an optical sensor coordinate system.

At 515, method 500 comprises receiving a depth map of an environment, the depth map comprising a plurality of pixels having locations in an optical sensor coordinate system. For example, FIG. 6A schematically shows an example depth map 600 comprising a plurality of pixels (dark circles) having locations in optical sensor coordinate system 602 (X, Y). In this example, each pixel is shown comprising a dark point, where larger points schematically represent brighter reflected illumination (e.g., smaller z-depth).

Figure 6B:
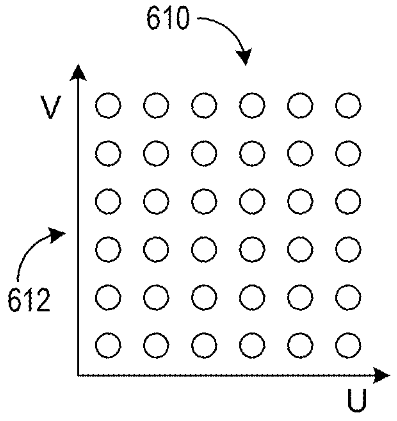
FIG. 6B shows an example pattern of illuminator dots in a normal plane.

At 520, method 500 comprises receiving a pattern of illuminator dots in an optical source coordinate system, each illuminator dot having a fixed location in defined plane in the optical source coordinate system. For example, the defined play may be an illuminator normal plane which corresponds to the center of each projection ray (e.g., the center of each illuminator dot). For example, FIG. 6B shows an example pattern of illuminator dots 610 (open circles) in illuminator normal plane 612 (U, V) (e.g., optical source coordinate system).

At 525, method 500 comprises projecting the depth map of the environment into a 3D point cloud in the optical sensor coordinate system. In other words, each pixel in the depth image may be projected into a 3D point in (X, Y, Z) space in the optical sensor coordinate system.

At 530, method 500 comprises assigning each point in the 3D point cloud a 2D location in the defined plane. Assigning each point in the 3D point cloud a 2D location in the defined plane may comprise transforming the 3D point cloud from the optical sensor coordinate system into the optical source coordinate system in three dimensions. For example, the 3D point cloud may undergo a rigid transformation from (X, Y, Z) to (U, V, Z). This transformation may be based on the offset between the optical source and the optical sensor, which may be stored in calibration data for the depth imaging system.

Figure 6C:
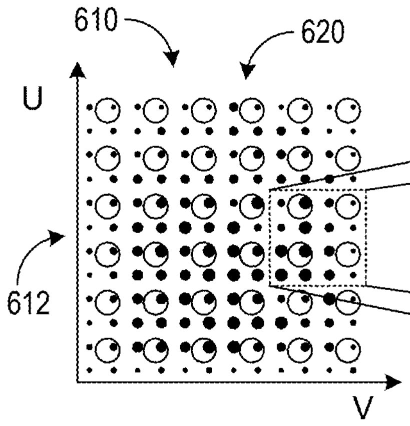
FIG. 6C shows a pattern of illuminator dots and a projected 3D point cloud co-plotted in a normal plane.

Assigning each point in the 3D point cloud a 2D location in the defined plane may further comprise projecting the transformed 3D point cloud into the defined plane (e.g., from U, V, Z to U, V). In this way, the depth image is transformed from the image plane in the optical sensor coordinate system to the defined plane in the optical source coordinate system (e.g., perpendicular to the direction of the illumination orientation). In some examples, projecting the transformed 3D point cloud into the defined plane comprises dividing X and Y coordinates for each point by a respective Z coordinate. In other words, the X coordinate may be divided by Z to yield the U coordinate, and the Y coordinate may be divided by Z to yield the V coordinate. As an example FIG. 6C shows pattern of illuminator dots 610 and projected 3D point cloud points 620 co-plotted in illuminator normal plane 612.

Figure 6D:
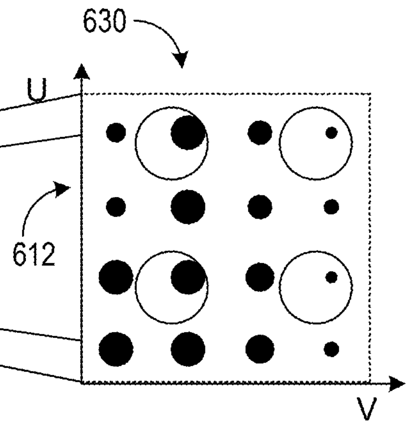
FIG. 6D shows an inset of FIG. 6C.

At 535, method 500 comprises interpolating a depth value for each illuminator dot in the pattern of illuminator dots based on transformed depth of points in the 3D point cloud. Interpolating a depth value for each illuminator dot in the pattern of illuminator dots based on transformed depth of points in the 3D point cloud may comprise assigning a depth value for an illuminator dot based on a depth value for a nearest assigned point from the 3D point cloud. FIG. 6D shows an inset 630 of FIG. 6C. Each illuminator dot can be matched to a nearest projected pixel, the depth value for such a nearest pixel may thus be assigned to the illuminator dot. The intensity of the illuminator dot is not necessarily considered when determining the nearest projected pixel. The nearest projected pixel to each illuminator dot may be determined by any suitable means, such as nearest neighbors or other vector algebra techniques. This associates the observed pixel in the depth may to an illuminator dot in the known illuminator dot pattern. In some examples, the depth map may be denoised of filtered prior to interpolating depth values for each illuminator dot. If an observed pixel is assigned a value of 0 intensity, it is considered occluded and is not taken into account in some examples.

Figure 6E:
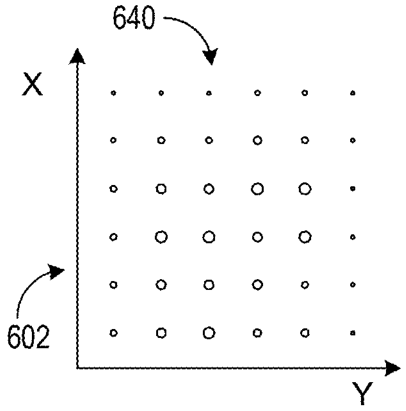
FIG. 6E shows the pattern of illuminator dots with assigned depth values.

At 540, method 500 comprises assigning each illuminator dot in the pattern of illuminator dots a 3D location in the optical sensor coordinate system. For example, assigning each illuminator dot in the pattern of illuminator dots a 3D location in the optical sensor coordinate system may comprise projecting locations for each illuminator dot into the 3D point cloud (e.g., from (U, V) to (U, V, Z). Assigning each illuminator dot in the pattern of illuminator dots a 3D location in the optical sensor coordinate system may further comprise converting projected locations for each illuminator dot into the optical sensor coordinate system (e.g., from (U, V, Z) to (X, Y, Z). For example, FIG. 6E shows transformed pattern of illuminator dots 640 with assigned depth values (e.g., diameters) in the optical sensor coordinate system 602 (e.g., (X, Y, Z). At 545, method 500 comprises outputting a depth for each illuminator dot in the pattern of illuminator dots in the optical sensor coordinate system. For example, a depth map may be output for display on a display device (e.g., display system 204).

By transforming the 3D point cloud to the optical source coordinate system, then normalizing the transformed depth map to the normal plane, the image pixels corresponding to the locations of the illuminator dots can be derived from the illuminator dot pattern in the optical source coordinate system. The illuminator dots can be associated with a depth value and can be transformed back to the 3D point cloud in the optical sensor coordinate system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
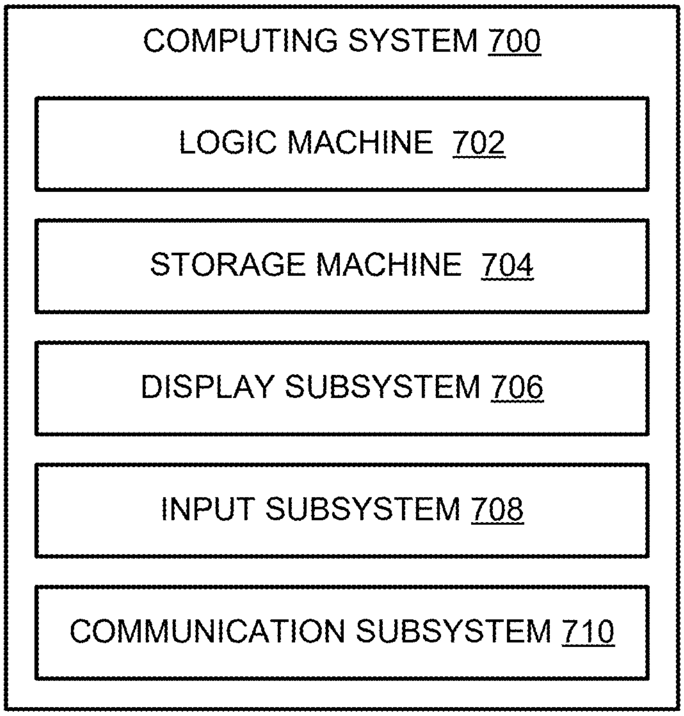
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7. Head mounted display device 200 and depth imaging system 300 may be examples of computing system 700. Controller 230 and logic subsystem 316 may be examples of logic machine 710. Storage subsystem 318 may be an example of storage machine 720.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a method for operating a sparse depth imaging system comprises receiving a depth map of an environment, the depth map comprising a plurality of pixels having locations in an optical sensor coordinate system; receiving a pattern of illuminator dots in an optical source coordinate system, each illuminator dot having a fixed location in defined plane in the optical source coordinate system; projecting the depth map of the environment into a 3D point cloud in the optical sensor coordinate system; assigning each point in the 3D point cloud a 2D location in the illuminator normal plane; interpolating a depth value for each illuminator dot in the pattern of illuminator dots based on transformed depth of points in the 3D point cloud; assigning each illuminator dot in the pattern of illuminator dots a 3D location in the optical sensor coordinate system; and outputting a depth for each illuminator dot in the pattern of illuminator dots in the optical sensor coordinate system. In such an example, or any other example, the defined plane is additionally or alternatively an illuminator normal plane. In any of the preceding examples, or any other example, assigning each point in the 3D point cloud the 2D location in the illuminator normal plane additionally or alternatively comprises transforming the 3D point cloud from the optical sensor coordinate system into the optical source coordinate system in three dimensions. In any of the preceding examples, or any other example, assigning each point in the 3D point cloud a 2D location in the illuminator normal plane additionally or alternatively comprises projecting the transformed 3D point cloud into the illuminator normal plane. In any of the preceding examples, or any other example, projecting the transformed 3D point cloud into the illuminator normal plane additionally or alternatively comprises dividing X and Y coordinates for each point by a respective Z coordinate. In any of the preceding examples, or any other example, interpolating the depth value for each illuminator dot in the pattern of illuminator dots based on transformed depth of points in the 3D point cloud additionally or alternatively comprises assigning a depth value for an illuminator dot based on a depth value for a nearest assigned point from the 3D point cloud. In any of the preceding examples, or any other example, assigning each illuminator dot in the pattern of illuminator dots the 3D location in the optical sensor coordinate system additionally or alternatively comprises projecting locations for each illuminator dot into the 3D point cloud. In any of the preceding examples, or any other example, assigning each illuminator dot in the pattern of illuminator dots a 3D location in the optical sensor coordinate system additionally or alternatively comprises converting projected locations for each illuminator dot into the optical sensor coordinate system.

In another example, a depth imaging system, comprises an optical source configured to output modulated structured light comprising a pattern of illuminator dots; an optical sensor comprising a 2D pixel grid; a logic subsystem; and a storage subsystem holding instructions executable by the logic subsystem to illuminate an environment using the optical source; receive reflected illumination at the optical sensor; generate a depth map of the environment, the depth map comprising a plurality of pixels having locations in an optical sensor coordinate system; receive the pattern of illuminator dots in an optical source coordinate system, each illuminator dot having a fixed location in an illuminator normal plane; project the depth map of the environment into a 3D point cloud in the optical sensor coordinate system; assign each point in the 3D point cloud a 2D location in the illuminator normal plane; interpolate a depth value for each illuminator dot in the pattern of illuminator dots based on transformed depth of points in the 3D point cloud; and assign each illuminator dot in the pattern of illuminator dots a 3D location in the optical sensor coordinate system. In such an example, or any other example, the storage subsystem additionally or alternatively holds instructions executable by the logic subsystem to output a depth for each illuminator dot in the pattern of illuminator dots in the optical sensor coordinate system. In any of the preceding examples, or any other example, assigning each point in the 3D point cloud the 2D location in the illuminator normal plane additionally or alternatively comprises transforming the 3D point cloud from the optical sensor coordinate system into the optical source coordinate system in three dimensions. In any of the preceding examples, or any other example, assigning each point in the 3D point cloud the 2D location in the illuminator normal plane additionally or alternatively comprises projecting the transformed 3D point cloud into the illuminator normal plane. In any of the preceding examples, or any other example, projecting the transformed 3D point cloud into the illuminator normal plane additionally or alternatively comprises dividing X and Y coordinates for each point by a respective Z coordinate. In any of the preceding examples, or any other example, interpolating the depth value for each illuminator dot in the pattern of illuminator dots based on transformed depth of points in the 3D point cloud additionally or alternatively comprises assigning a depth value for an illuminator dot based on a depth value for a nearest assigned point from the 3D point cloud. In any of the preceding examples, or any other example, assigning each illuminator dot in the pattern of illuminator dots the 3D location in the optical sensor coordinate system additionally or alternatively comprises projecting locations for each illuminator dot into the 3D point cloud. In any of the preceding examples, or any other example, assigning each illuminator dot in the pattern of illuminator dots a 3D location in the optical sensor coordinate system additionally or alternatively comprises converting projected locations for each illuminator dot into the optical sensor coordinate system. In any of the preceding examples, or any other example, the depth imaging system is additionally or alternatively a head-mounted display system. In any of the preceding examples, or any other example, the optical source is additionally or alternatively an infrared (IR) or near-infrared (NIR) illumination source configured to output modulated structured IR or NIR light comprising the pattern of illuminator dots.

In yet another example, a storage machine holds instructions executable by a logic machine to illuminate an environment using an optical source configured to output modulated structured light comprising a pattern of illuminator dots; receive reflected illumination at an optical sensor comprising a 2D pixel grid; generate a depth map of the environment, the depth map comprising a plurality of pixels having locations in an optical sensor coordinate system; receive the pattern of illuminator dots in an optical source coordinate system, each illuminator dot having a fixed location in an illuminator normal plane; project the depth map of the environment into a 3D point cloud in the optical sensor coordinate system; assign each point in the 3D point cloud a 2D location in the illuminator normal plane; interpolate a depth value for each illuminator dot in the pattern of illuminator dots based on transformed depth of points in the 3D point cloud; and assign each illuminator dot in the pattern of illuminator dots a 3D location in the optical sensor coordinate system. In such an example, or any other example, the storage machine additionally or alternatively holds instructions executable by the logic machine to output a depth for each illuminator dot in the pattern of illuminator dots in the optical sensor coordinate system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a sparse depth imaging system, comprising:

receiving a depth map of an environment, the depth map comprising a plurality of pixels having locations in an optical sensor coordinate system, and the depth map also comprising illumination dots corresponding to illuminator dots of a structured light optical source;

receiving a pattern of the illuminator dots in an optical source coordinate system, each illuminator dot having a fixed location in a defined plane in the optical source coordinate system;

projecting the depth map of the environment into a 3D point cloud in the optical sensor coordinate system;

assigning each point in the 3D point cloud a 2D location in the defined plane;

interpolating a depth value for each illuminator dot in the pattern of illuminator dots based on transformed depth of points in the 3D point cloud;

assigning each illuminator dot in the pattern of illuminator dots a 3D location in the optical sensor coordinate system; and outputting a depth for each illuminator dot in the pattern of illuminator dots in the optical sensor coordinate system.

2. The method of claim 1, wherein the defined plane is an illuminator normal plane.

3. The method of claim 2, wherein assigning each point in the 3D point cloud the 2D location in the illuminator normal plane comprises:

transforming the 3D point cloud from the optical sensor coordinate system into the optical source coordinate system in three dimensions.

4. The method of claim 3, wherein assigning each point in the 3D point cloud the 2D location in the illuminator normal plane further comprises:

projecting the transformed 3D point cloud into the illuminator normal plane.

5. The method of claim 4, wherein projecting the transformed 3D point cloud into the illuminator normal plane comprises dividing X and Y coordinates for each point by a respective Z coordinate.

6. The method of claim 1, wherein interpolating the depth value for each illuminator dot in the pattern of illuminator dots based on transformed depth of points in the 3D point cloud comprises:

assigning a depth value for an illuminator dot based on a depth value for a nearest assigned point from the 3D point cloud.

7. The method of claim 1, wherein assigning each illuminator dot in the pattern of illuminator dots the 3D location in the optical sensor coordinate system comprises:

projecting locations for each illuminator dot into the 3D point cloud.

8. The method of claim 7, wherein assigning each illuminator dot in the pattern of illuminator dots the 3D location in the optical sensor coordinate system further comprises:

converting projected locations for each illuminator dot into the optical sensor coordinate system.

9. A depth imaging system, comprising:

an optical source configured to output modulated structured light comprising a pattern of illuminator dots;

an optical sensor comprising a 2D pixel grid;

a logic subsystem; and a storage subsystem holding instructions executable by the logic subsystem to:

illuminate an environment using the optical source;

receive reflected illumination at the optical sensor;

generate a depth map of the environment, the depth map comprising a plurality of pixels having locations in an optical sensor coordinate system;

receive the pattern of illuminator dots in an optical source coordinate system, each illuminator dot having a fixed location in an illuminator normal plane;

project the depth map of the environment into a 3D point cloud in the optical sensor coordinate system;

assign each point in the 3D point cloud a 2D location in the illuminator normal plane;

interpolate a depth value for each illuminator dot in the pattern of illuminator dots based on transformed depth of points in the 3D point cloud;

assign each illuminator dot in the pattern of illuminator dots a 3D location in the optical sensor coordinate system; and output a depth for each illuminator dot in the pattern of illuminator dots in the optical sensor coordinate system.

10. The depth imaging system of claim 9, wherein assigning each point in the 3D point cloud the 2D location in the illuminator normal plane comprises:

transforming the 3D point cloud from the optical sensor coordinate system into the optical source coordinate system in three dimensions.

11. The depth imaging system of claim 10, wherein assigning each point in the 3D point cloud the 2D location in the illuminator normal plane further comprises:

projecting the transformed 3D point cloud into the illuminator normal plane.

12. The depth imaging system of claim 11, wherein projecting the transformed 3D point cloud into the illuminator normal plane comprises dividing X and Y coordinates for each point by a respective Z coordinate.

13. The depth imaging system of claim 9, wherein interpolating the depth value for each illuminator dot in the pattern of illuminator dots based on transformed depth of points in the 3D point cloud comprises:

assigning a depth value for an illuminator dot based on a depth value for a nearest assigned point from the 3D point cloud.

14. The depth imaging system of claim 9, wherein assigning each illuminator dot in the pattern of illuminator dots the 3D location in the optical sensor coordinate system comprises:

projecting locations for each illuminator dot into the 3D point cloud.

15. The depth imaging system of claim 9, wherein assigning each illuminator dot in the pattern of illuminator dots a 3D location in the optical sensor coordinate system further comprises:

converting projected locations for each illuminator dot into the optical sensor coordinate system.

16. The depth imaging system of claim 9, wherein the depth imaging system is a head-mounted display system.

17. The depth imaging system of claim 9, wherein the optical source is an infrared (IR) or near-infrared (NIR) illumination source configured to output modulated structured IR or NIR light comprising the pattern of illuminator dots.

18. A storage machine holding instructions executable by a logic machine to:

illuminate an environment using an optical source configured to output modulated structured light comprising a pattern of illuminator dots;

receive reflected illumination at an optical sensor comprising a 2D pixel grid;

generate a depth map of the environment based upon the reflected illumination received at the 2D pixel grid of the optical sensor, the depth map comprising a plurality of pixels having locations in an optical sensor coordinate system;

receive the pattern of illuminator dots in an optical source coordinate system, each illuminator dot having a fixed location in an illuminator normal plane;

project the depth map of the environment into a 3D point cloud in the optical sensor coordinate system;

assign each point in the 3D point cloud a 2D location in the illuminator normal plane;

interpolate a depth value for each illuminator dot in the pattern of illuminator dots based on transformed depth of points in the 3D point cloud;

assign each illuminator dot in the pattern of illuminator dots a 3D location in the optical sensor coordinate system; and output a depth for each illuminator dot in the pattern of illuminator dots in the optical sensor coordinate system.

* * * * *